(12) United States Patent
Whitten

(10) Patent No.: US 12,031,669 B2
(45) Date of Patent: Jul. 9, 2024

(54) INTERLOCKING MAGNETIC DEVICE MOUNT WITH FOLDABLE RING STAND

(71) Applicant: ROKFORM IP LLC, Irvine, CA (US)

(72) Inventor: Jeff Whitten, Irvine, CA (US)

(73) Assignee: RokForm IP LLC, Irvine, CA (US)

( * ) Notice: Subject to any disclaimer, the term of this patent is extended or adjusted under 35 U.S.C. 154(b) by 105 days.

(21) Appl. No.: 17/507,039

(22) Filed: Oct. 21, 2021

(65) Prior Publication Data

US 2022/0117384 A1 Apr. 21, 2022

Related U.S. Application Data

(60) Provisional application No. 63/094,600, filed on Oct. 21, 2020.

(51) Int. Cl.
| | | |
|---|---|---|
| *F16M 13/02* | (2006.01) | |
| *A45C 11/00* | (2006.01) | |
| *A45F 5/10* | (2006.01) | |

(52) U.S. Cl.
CPC ............ *F16M 13/02* (2013.01); *A45F 5/10* (2013.01); *F16M 13/022* (2013.01); *A45C 2011/002* (2013.01); *A45F 2200/0516* (2013.01)

(58) Field of Classification Search
CPC ...... F16M 13/04; F16M 13/02; F16M 13/022; F16M 13/00; F16M 13/005; F16M 11/38; A45F 5/10; A45F 2200/0516; A47G 1/143; H04M 1/04; A45C 2011/002
USPC ........................................................ 248/688
See application file for complete search history.

(56) References Cited

U.S. PATENT DOCUMENTS

| | | | |
|---|---|---|---|
| 3,080,634 A | 3/1936 | Stig | |
| 3,179,367 A | 4/1965 | Rapata | |
| 3,986,780 A | 10/1976 | Nivet | |
| 5,836,565 A * | 11/1998 | Chang | A47G 1/143 |
| | | | 40/748 |
| 6,305,588 B1 | 10/2001 | Michel | |
| 7,140,586 B2 | 11/2006 | Seil | |
| D564,754 S | 3/2008 | Tages et al. | |
| 7,374,142 B2 | 5/2008 | Carnevali | |
| 7,523,906 B2 | 4/2009 | Bennett | |

(Continued)

FOREIGN PATENT DOCUMENTS

| | | |
|---|---|---|
| AU | 201817027 S | 1/2019 |
| AU | 201817028 S | 1/2019 |

(Continued)

OTHER PUBLICATIONS

Https://www.amazon.com/Rokform-Magnetic-Sport-Stand-Black/dp/B08KFQGYXJ/ref=asc_df_B08KFQGYXJ/?tag=hyprod-20&linkCode=df0&hvadid=475789288720&hvpos=&hvnetw=g&hvrand=7572727887956642181&hvpone=&hvptwo=&hvqmt=&hvdev=c&hvdvcmdl=&hvlocint=&hvlocphy=1018655&hvtargid=pla-1115761632956&psc=1 (Year: 2020).*

(Continued)

*Primary Examiner* — Ingrid M Weinhold
(74) *Attorney, Agent, or Firm* — Knobbe, Martens, Olson & Bear, LLP

(57) ABSTRACT

A mounting assembly that can couple to a case for handheld electronic devices is disclosed herein. The mounting assembly can include a ring that can be rotated between deployed and stowed configurations. The ring can include flat edges flat edges that can securely support the case at an angle relative to a support surface. The mounting assembly can include a mount with a magnet that can be used to couple the (Continued)

case with the handheld electronic device therein to magnetic surfaces.

21 Claims, 12 Drawing Sheets

(56) References Cited

U.S. PATENT DOCUMENTS

| | | | |
|---|---|---|---|
| D606,738 S | 12/2009 | Hofer et al. | |
| 7,652,888 B2 | 1/2010 | Bohlinger et al. | |
| 7,685,904 B2 | 3/2010 | Cutsforth | |
| D627,771 S | 11/2010 | Smith et al. | |
| 7,930,006 B2 | 4/2011 | Neu et al. | |
| D646,672 S | 10/2011 | Fathollahi | |
| D647,085 S | 10/2011 | Chung et al. | |
| D653,190 S | 1/2012 | Richter | |
| D654,043 S | 2/2012 | Pan et al. | |
| D660,305 S * | 5/2012 | Ho | D14/447 |
| 8,167,127 B2 | 5/2012 | Martin et al. | |
| 8,172,247 B2 | 5/2012 | Weber et al. | |
| 8,267,418 B1 | 9/2012 | Chuang | |
| 8,317,067 B2 | 11/2012 | Lewis | |
| D671,932 S | 12/2012 | Azoulay | |
| 8,439,239 B2 | 5/2013 | Lee | |
| 8,469,245 B2 | 6/2013 | Gregory et al. | |
| D685,362 S | 7/2013 | Murchison et al. | |
| D685,363 S | 7/2013 | Murchison et al. | |
| D685,785 S | 7/2013 | Seoc et al. | |
| D687,004 S | 7/2013 | Behling | |
| 8,490,789 B2 | 7/2013 | Lach et al. | |
| D691,144 S * | 10/2013 | Peters | D14/440 |
| 8,544,644 B2 | 10/2013 | Meehan | |
| 8,616,508 B1 | 12/2013 | Coleman | |
| D697,060 S | 1/2014 | Yang | |
| 8,708,151 B2 | 4/2014 | Whitten et al. | |
| D711,886 S | 8/2014 | Kerawala et al. | |
| 8,800,763 B2 | 8/2014 | Hale | |
| 8,830,663 B2 | 9/2014 | Child et al. | |
| D718,290 S | 11/2014 | Whitten et al. | |
| 8,922,995 B2 * | 12/2014 | Su | H05K 5/0234 361/679.55 |
| 8,936,222 B1 | 1/2015 | Bastian et al. | |
| 8,950,715 B2 * | 2/2015 | Chiu | F16M 13/022 248/205.8 |
| D725,119 S | 3/2015 | Gaylord | |
| D726,170 S | 4/2015 | Ng | |
| D726,732 S | 4/2015 | Lay et al. | |
| D739,857 S | 9/2015 | Lay et al. | |
| 9,185,953 B2 | 11/2015 | Whitten et al. | |
| 9,243,739 B2 | 1/2016 | Peters | |
| 9,383,774 B2 | 7/2016 | Whitten et al. | |
| 9,402,016 B1 | 7/2016 | Hidalgo | |
| D766,225 S * | 9/2016 | Williams | D14/250 |
| 9,498,034 B2 | 11/2016 | Whitten et al. | |
| 9,592,871 B2 | 3/2017 | Whitten et al. | |
| 9,616,821 B2 | 4/2017 | Elharar | |
| 9,700,114 B2 | 7/2017 | Whitten et al. | |
| 9,723,910 B2 * | 8/2017 | Due | A45F 5/10 |
| 9,772,064 B2 * | 9/2017 | Chen | F16M 13/04 |
| D803,222 S * | 11/2017 | Cheng | D14/440 |
| 10,070,707 B2 | 9/2018 | Whitten et al. | |
| 10,093,377 B2 | 10/2018 | Whitten et al. | |
| 10,112,670 B2 | 10/2018 | Whitten et al. | |
| 10,122,400 B2 | 11/2018 | Tiller et al. | |
| 10,278,299 B2 * | 4/2019 | Kim | F16M 13/04 |
| D850,455 S * | 6/2019 | Cheng | D14/440 |
| 10,326,488 B2 | 6/2019 | Wojcik | |
| D855,048 S * | 7/2019 | Kim | D14/253 |
| 10,419,054 B1 * | 9/2019 | VanTassell | H04M 1/04 |
| 10,420,407 B2 | 9/2019 | Whitten et al. | |
| D892,804 S * | 8/2020 | Lin | D14/440 |
| D904,386 S * | 12/2020 | Luo | D3/218 |
| 10,864,956 B2 | 12/2020 | Whitten et al. | |
| 11,044,974 B2 | 6/2021 | Whitten et al. | |
| D933,057 S * | 10/2021 | Kim | D14/251 |
| D944,256 S * | 2/2022 | Cheng | D14/440 |
| D946,578 S * | 3/2022 | Cheng | D14/440 |
| 11,265,035 B1 * | 3/2022 | Zhang | H04M 1/04 |
| D967,829 S * | 10/2022 | Lin | D14/440 |
| 11,552,667 B2 * | 1/2023 | Balderston | H04B 1/3877 |
| 2002/0139822 A1 | 10/2002 | Infanti | |
| 2004/0204169 A1 | 10/2004 | Goradesky | |
| 2006/0147080 A1 | 7/2006 | Wilson et al. | |
| 2006/0229740 A1 | 10/2006 | Kreisel et al. | |
| 2007/0014120 A1 | 1/2007 | Kitamura | |
| 2007/0174187 A1 | 7/2007 | Altberg et al. | |
| 2007/0212931 A1 | 9/2007 | Livingston | |
| 2007/0221694 A1 | 9/2007 | Aguiliar | |
| 2008/0023508 A1 | 1/2008 | Harchol | |
| 2008/0251512 A1 | 10/2008 | Griffin et al. | |
| 2008/0314941 A1 | 12/2008 | Knych et al. | |
| 2010/0084527 A1 | 4/2010 | Lau et al. | |
| 2011/0043086 A1 | 2/2011 | Cui et al. | |
| 2011/0143583 A1 | 6/2011 | Zilmer et al. | |
| 2011/0227735 A1 | 9/2011 | Fawcett et al. | |
| 2012/0298820 A1 | 11/2012 | Manolidis | |
| 2013/0078855 A1 | 3/2013 | Hornick et al. | |
| 2013/0277530 A1 * | 10/2013 | Wong | F16M 13/04 248/688 |
| 2013/0292270 A1 | 11/2013 | Lach et al. | |
| 2013/0292296 A1 | 11/2013 | Kang et al. | |
| 2014/0287800 A1 | 9/2014 | Ho | |
| 2014/0355200 A1 | 12/2014 | Thiers | |
| 2015/0189963 A1 | 7/2015 | Lai et al. | |
| 2015/0201723 A1 | 7/2015 | Rayner et al. | |
| 2016/0192752 A1 | 7/2016 | Lach et al. | |
| 2018/0013463 A1 * | 1/2018 | Jeon | H04M 1/04 |
| 2018/0220782 A1 * | 8/2018 | Mody | A45F 5/00 |
| 2018/0359346 A1 * | 12/2018 | Chen | F16M 13/00 |
| 2019/0208046 A1 * | 7/2019 | Gluck | H04M 1/21 |
| 2020/0326030 A1 * | 10/2020 | Surani | F16M 11/38 |
| 2020/0329133 A1 * | 10/2020 | Surani | A45F 5/00 |
| 2021/0188380 A1 | 6/2021 | Whitten et al. | |
| 2021/0215327 A1 * | 7/2021 | Grandadam | F21V 21/145 |
| 2021/0227960 A1 * | 7/2021 | Carnevali | A45F 5/10 |
| 2021/0261215 A1 | 8/2021 | Whitten et al. | |
| 2021/0315340 A1 | 10/2021 | Whitten et al. | |
| 2022/0117384 A1 | 4/2022 | Whitten | |
| 2023/0167940 A1 * | 6/2023 | Lin | F16M 11/105 361/679.21 |

FOREIGN PATENT DOCUMENTS

| | | |
|---|---|---|
| AU | 201817029 S | 1/2019 |
| CN | 303239699 S | 6/2015 |
| DE | 20 2004 017 041 U1 | 3/2005 |
| EP | EU 005832789 | 1/2019 |
| EP | EU 005832813 | 1/2019 |
| EP | EU 005832854 | 3/2019 |
| WO | WO 2013/106849 | 7/2013 |

OTHER PUBLICATIONS

Affidavit of Christopher Buttler dated Nov. 18, 2017 and Exhibits Welcome to iBikeMount.com—The Bike Mount Solution for iPho . . . , https://web.archive.org/web/20090721175904/http://www.ibikemount.com:80/index.html, in 20 pages.

Bicio—GoRide—Bike Mount for iPhone 3G/3GS, http://www.bicio.com/GoRide_iphoneBikeMount.php, accessed via web archive, dated Nov. 29, 2011.

Bicio—GoRide Product page depicting an iPhone Bike Mount and Base Mount, http://www.bicio.com/category-bike.php, accessed via web archive, dated Dec. 8, 2011.

Bicio—GoRide iPhone Bike Mount, http://www.bicio.com/GoRide_iphoneBase.php, accessed via web archive, dated Apr. 16, 2011.

Donovan, Thomas J., Letter to counsel for Applicant, Dec. 8, 2017.

Donovan, Thomas J., Letter to counsel for Applicant, dated Mar. 15, 2018, and accompanying exhibits to letter.

"The Wallee Wall Mount + Hard Case System for iPad", The Gadgeteer (Jul. 29, 2010), available at http://the-gadgeteer.com/2010/07/29/the-wallee-wall-mount-hard-case-system-for-ipad/.

(56) References Cited

OTHER PUBLICATIONS

The Wallee iPad Case and Wall Mount, https://web.archive.org/web/20110108191535/http://thewallee.com/#, in 89 pages.
The Wallee—Features page depicting iPad hard case and wall plate, http://thewallee.com/site/about ("features" tab), accessed via web archive, dated Jan. 8, 2011.
The Wallee—Technical Specifications page depicting iPad hard case and wall plate, http://thewallee.com/site/about ("tech specs" tab), accessed via web archive, dated Jan. 8, 2011.

* cited by examiner

INTERLOCKING MAGNETIC DEVICE MOUNT WITH FOLDABLE RING STAND

INCORPORATION BY REFERENCE

This application claims the benefit under 35 U.S.C. § 119(e) as a non-provisional application of U.S. Prov. Appl. No. 63/094,600, filed on Oct. 21, 2020, which is hereby incorporated by reference in its entirety. Any and all applications for which a foreign or domestic priority claim is identified in the Application Data Sheet as filed with the present application are hereby incorporated by reference under 37 CFR § 1.57.

BACKGROUND

Field

The disclosure relates to mounting arrangements in general and mounting arrangements for electronic devices in particular.

Description of the Related Art

Handheld and/or portable electronic devices (e.g., smartphones, tablet computers, handheld readers, portable speakers and similar devices) are becoming important and common tools. These tools are constantly in use, both at home and on the go.

However, with this frequency and variety of use comes the need or desirability for hands-free viewing of the electronic device. While certain arrangements exist for hands-free viewing, there remains a need for improved arrangements that permit easier and/or more secure hands-free viewing or at least provide the public with a useful choice.

Additionally, the cost of handheld and/or portable electronic devices continue to increase. With that increase, the need or desirably to avoid dropping and damaging the electronic device when held by a user is becoming increasingly desirable. Accordingly, improved arrangements that enable the user to avoid dropping and damaging an electronic device are needed.

SUMMARY

The systems, methods and devices described herein have innovative aspects, no single one of which is indispensable or solely responsible for their desirable attributes. Without limiting the scope of the claims, some of the advantageous features will now be summarized.

In some embodiments, a mount assembly that can couple to a case for a handheld electronic device is disclosed herein. The mount assembly can include a mount that can be coupled to a case for a handheld electronic device. The mount can include a magnet that can secure the mount assembly to magnetic surfaces. The mount assembly can include a ring rotatably coupled to the mount. The ring can be rotated between a stowed position and a deployed position.

In some embodiments, the ring can be disposed around the mount in the stowed position.

In some embodiments, the ring can include flat edges that can securely support the case at an angle relative to a support surface.

In some embodiments, the ring can include protrusions disposed between adjacent flat edges.

In some embodiments, the mount can include a mounting base and an interlocking member that can interface with a receiving region of the case. The magnet can be positioned within the mounting base and coupled to the interlocking member.

In some embodiments, the interlocking member can include a protrusion that can be received within a corresponding opening of the mounting base such that the interlocking member and mounting base rotate together.

In some embodiments, the protrusion can include a square periphery with rounded corners.

In some embodiments, the magnet can be coupled to the mounting base and interlocking member via a bolt and threaded boss.

In some embodiments, a conical spring washer can be disposed between the threaded boss and the interlocking member.

In some embodiments, the interlocking member can include a plurality of engagement tabs that can facilitate coupling the mounting assembly to a receiving region of the case via a twist-lock engagement.

In some embodiments, the mount base can include feet that can facilitate coupling the mounting assembly to a receiving region of the case via a twist-lock engagement.

In some embodiments, the mount assembly can include an adhesive backing disposed on a rear surface of the mount. The adhesive backing can facilitate adhering the mount assembly to the case.

In some embodiments, the mount assembly can include an outer ring disposed around the mount. The outer ring can facilitate wireless charging of the handheld electronic device.

In some embodiments, the mount assembly can include adhesive backing. The outer ring can be disposed on the adhesive backing.

In some embodiments, the mount assembly can include a channel that can receive the ring in the stowed position. The channel can be disposed between the outer ring and the mount.

In some embodiments, a mount assembly that can couple to a case for a handheld electronic device is disclosed herein. The mount assembly can include a mount that can be coupled to a case for a handheld electronic device. The mount can include a magnet that can secure the mount assembly to magnetic surfaces. The mount assembly can include a ring rotatably coupled to the mount. The ring can rotate between a stowed position around the mount and a deployed position rotated away from the mount. The mount assembly can include an outer ring that can be disposed around the ring in the stowed position. The outer ring can facilitate wireless charging of the handheld electronic device.

In some embodiments, the mount assembly can include adhesive backing. The mount and outer ring can be disposed on the adhesive backing. The adhesive backing can facilitate adhesion to the case.

In some embodiments, the mount assembly can include a channel that can receive the ring in the stowed position. The channel can be disposed between the outer ring and the mount.

In some embodiments, the mount can include a mounting base and a cover. The mounting base can house the magnet therein. The cover can be disposed over the magnet.

In some embodiments, the mounting base can include a tab and the cover can include a corresponding notch. The tab can be disposed in the notch to orient the mounting base and the cover relative to each other.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
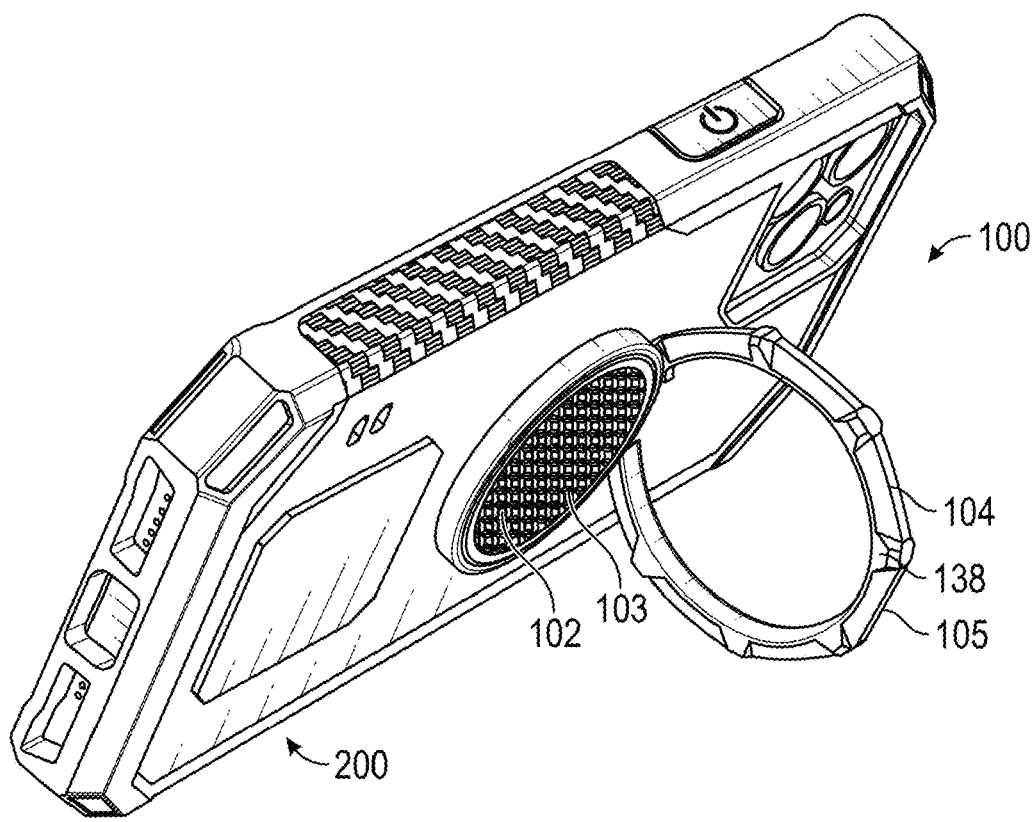
FIG. 1 illustrates an example embodiment of a mount assembly coupled to a case for handheld electronic devices or similar objects.

Embodiments of systems, components and methods of assembly and manufacture will now be described with reference to the accompanying figures, wherein like numerals can refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

FIGS. 1-13 illustrate example embodiments of a mounting arrangement for a handheld and/or portable electronic device. The illustrated mounting arrangement is also suitable for use, or could be modified for use, with other handheld or similarly-sized objects. As used herein, handheld and/or portable electronic devices include, but are not limited to, smartphones, tablet computers, handheld readers, portable speakers and similar devices.

In at least some embodiments disclosed herein, the mounting arrangements can be implemented in the context of a protection system or case for a portable or handheld electronic device (hereinafter "handheld electronic device"). Some embodiments include a case that incorporates an attachment region for attaching a removable mount assembly configured to support the handheld electronic device within the case. The removable mount assembly can be configured to be affixed to a variety of surfaces. Some embodiments may also incorporate an optional anti-slip member comprising an anti-slip surface for slip prevention when the case and handheld electronic device are supported upon a surface. In some configurations, the case can include a magnet for attachment of the device to magnetic surfaces. The magnet can be housed within the anti-slip member or separately therefrom.

Although discussed in the context of a case for a handheld electronic device, the mounting arrangement can also be used to removably couple other objects to a mount assembly. Some embodiments of the case comprise a shell for securing and protecting a handheld electronic device. In some embodiments, the shell may be in multiple pieces for ease of assembly around a handheld electronic device. In other embodiments, the shell may include relatively soft or deformable regions (e.g., side walls) that facilitate assembly of the shell to the handheld electronic device. The shell can provide an attachment region for a removable mounting member that can attach to various surfaces, such as but not limited to a desk, vehicle dashboard, mirror, etc. The shell preferably is formed at least in part by a material that is generally rigid and lightweight, such as but not limited to an injection molded polycarbonate or other suitable plastic material(s). Preferably, the shell comprises sidewalls that surround an entirety or portions of the peripheral edges of the handheld electronic device. The sidewalls preferably are arranged to protect the device by absorbing incidental shock forces and/or inhibiting or preventing direct contact between the device and another object. The sidewalls also desirably contain various openings to allow access to the control buttons, inputs, and outputs of the handheld electronic device. The rear surface of the shell is preferably further designed with various openings to allow additional access to features of the handheld electronic device that may be located on the rear of the device (such as a camera) or to reduce the weight of the shell.

With reference to FIG. 1, an example embodiment of a mount assembly 100 (also referred to as a handheld electronic device mount) is illustrated. The mount assembly 100 can be mounted, connected, attached, interlocked, adhered, fastened, and/or otherwise coupled with a case 200 (also referred to as a protective shell) for a handheld electronic device, directly to the handheld electronic device, or another surface. Specifically, the mount assembly 100 can include a mount 102 that is mounted, connected, attached, interlocked, fastened, adhered, and/or otherwise coupled with a case 200, directly to the handheld electronic device, or another surface.

In some embodiments, the mount 102 can include a magnet, as described in more detail herein. The magnet can enable the user to couple (e.g., fix) the user's handheld electronic device to magnetic surfaces (e.g., surfaces with iron, cobalt, nickel, etc.). With the mount 102 disposed on a side of the case 200 opposite a display of the handheld electronic device, the user can couple the handheld electronic device to a magnetic surface with the display oriented outward, which can be convenient for hands-free viewing or interaction without holding the handheld electronic device.

The mount 102 can be circular in shape, as illustrated. In some variants, the mount 102 can be oval, polygonal (e.g., pentagon, hexagon, heptagon, octagon, nonagon, or decagon), irregular, and/or other shapes. The mount 102 can include an anti-slip surface 103. In some variants, the anti-slip surface 103 can have characteristics that increase friction to prevent slipping. For example, the anti-slip surface 103 can include texture, such as a roughed surface, to increase friction such that the mount 102 will be less likely to slip across a surface. In some variants, the mount 102 or a portion thereof can be made of a material, such as rubber, with a high coefficient of friction to reduce the likelihood that the mount 102 will slide across a surface (e.g., slip) upon contact therewith.

The mount assembly 100 can include a ring 104 (also referred to as a ring stand). The ring 104 can be deployed, as illustrated in FIG. 1, to prop up or support the case 200 on a surface. The ring 104 can enable the user to comfortably view a display of the handheld electronic device without holding the device by supporting the case 200 at an angle relative to a supportive surface (e.g., a table top). The ring 104 can include one or more edges 105 (also called sides). The one or more edges 105 can enable the ring 104 to provide secure support to the case 200. The one or more edges 105 can prevent or lessen sliding of the ring 104 across the supportive surface. The edges 105 can be curved or straight (e.g., flat). The ring 104 can have one, two, three, four, five, six, seven, eight, nine, ten, or more edges 105. The ring 104 can be a circle, oval, polygon (e.g., pentagon, hexagon, heptagon, octagon, nonagon, or decagon), and/or other shapes. In some variants, the ring 104 can be an irregular shape. The ring 104 can include one or more protrusions 138 (also referred to as ridges or bumps) disposed thereon. A protrusion 138 can be disposed between adjacent edges 105. A protrusion 138 can define the junction between adjacent edges 105. The protrusion 138 can help the user to securely grasp the ring 104. The ring 104 can be made of a variety of materials, which can include stainless steel. The ring 104 can be made via a variety of techniques which can include forging and machining.

In addition to functioning as a stand for hands-free viewing, the ring 104 can enable the user to securely hold the case 200. The user can grip the ring 104 and/or insert one or more fingers therethrough (e.g., use as a finger ring), which can advantageously reduce the likelihood that the user will inadvertently drop the case 200 with the handheld electronic device therein.

Figure 2:
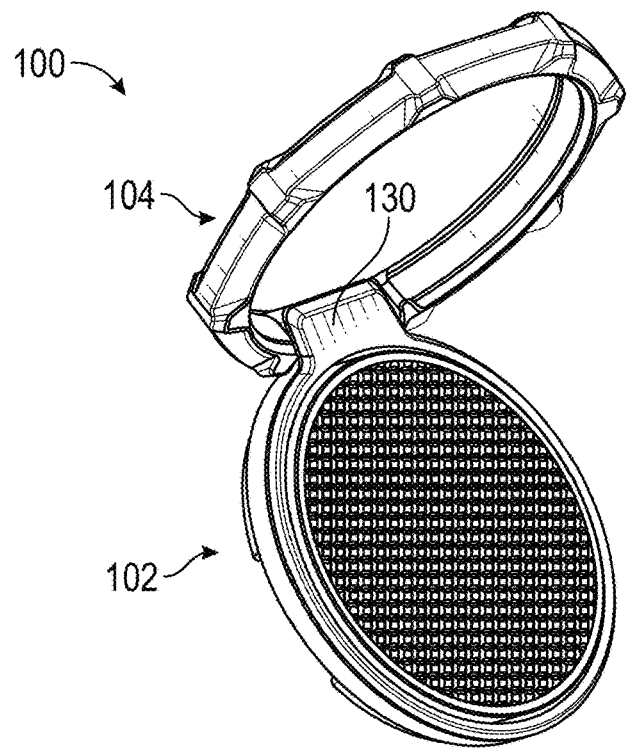
FIG. 2 illustrates the example embodiment of the mount assembly of FIG. 1 decoupled from the case with a ring deployed.

The ring 104 an be rotated to different positions. For example, the ring 104 can be rotated to a deployed position, which can be rotated away from the case 200 (e.g., increasing the angle between the case 200 and the ring 104) as shown in FIGS. 1 and 2. In a deployed position, the user can use the ring 104 as a stand to support the case 200 and handheld electronic device therein on a surface. In the deployed position, the user can grip the ring 104 or insert one or more fingers therethrough to securely hold the case 200 and handheld electronic device therein.

Figure 3:
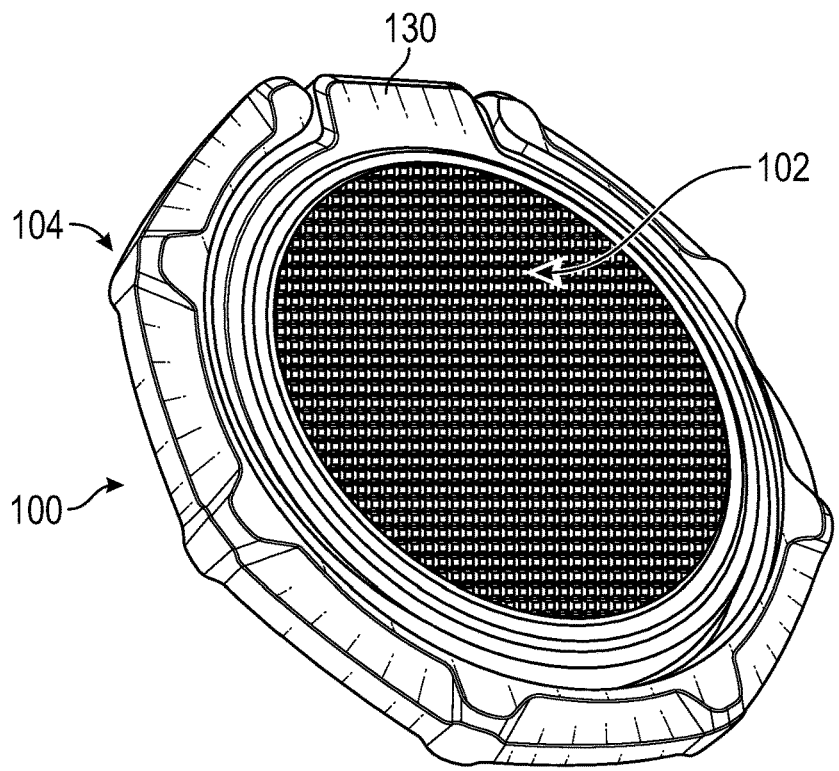
FIG. 3 illustrates the example embodiment of the mount assembly of FIG. 1 decoupled from the case with the ring stowed.

The ring 104 can be rotated to a stowed position, which can be rotated proximate or adjacent the case 200. In some variants, the ring 104 can be disposed around the mount 102 in the stowed position, as illustrated in FIG. 3. The mount assembly 100 can have a smaller profile with the ring 104 in the stowed position compared to the deployed position, which can reduce the likelihood that the ring 104 will inadvertently catch or snag on objects (e.g., making insertion into the pocket or bag of a user easier). The inner periphery of the ring 104 can surround at least a portion of the outer periphery of the mount 102 in the stowed position. The inner periphery of the ring 104 can be radially offset from at least a portion of the outer periphery of the mount 102 in the stowed position. The ring 104 can be coupled to the mount 102 at a tab 130 thereof. The ring 104 can rotate relative to the tab 130. The tab 130 can extend from a periphery of the mount 102.

Figure 4:
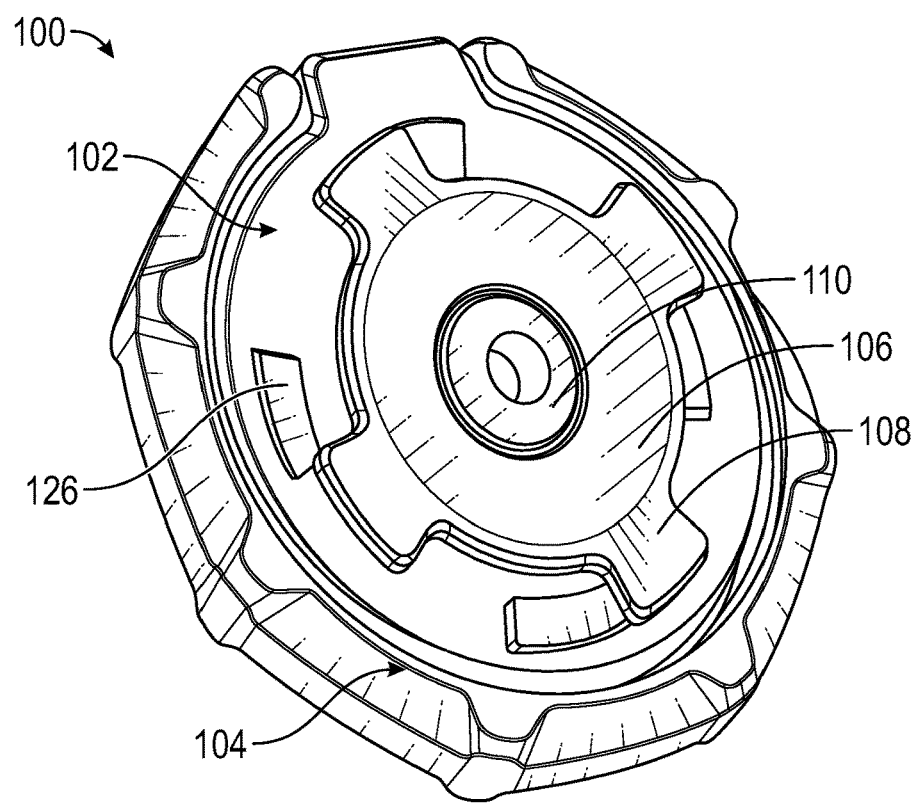
FIG. 4 illustrates an example embodiment of an interlocking member of the example embodiment of the mount assembly of FIG. 1.

The mount 102 can include one or features that facilitate coupling to the case 200. As shown in FIG. 4, the mount 102 can include an interlocking member 106 to facilitate coupling to the case 200. The interlocking member 106 can be secured to the mount 102 via a variety of techniques, which can include a boss 110 (also referred to as a threaded boss or nut) and bolt. The interlocking member 106 can include one or more engagement tabs 108. As illustrated, the interlocking member 106 includes four engagement tabs 108. In some variants, the interlocking member 106 can include one, two, three, fix, six or more engagement tabs 108. The engagement tabs 108 can be radially distributed around the interlocking member 106. The engagement tabs 108 can include rounded corners or edges to reduce stress concentrators. The engagement tabs 108 can be equidistantly spaced from each other. The interlocking member 106 can extend away from the mount 102 such that the engagement tabs 108 are spaced away from the mount 102. The interlocking member 106 can be made of a variety of materials, which can include aluminum.

The mount 102 can include one or more feet 126 (also referred to as protrusions or steps). The feet 126 can be raised from a rear surface of the mount 102. As illustrated, the mount 102 includes four feet 126. In some variants, the mount 102 can include one, two, three, five, six, or more feet. In some variants, the mount 102 can include as many feet 126 as engagement tabs 108. In some variants, the mount 102 can include fewer feet 126 compared to engagement tabs 108. In some variants, the feet 126 can be radially distributed about a central axis of the case 200. The feet 126 can be circumferentially offset relative to the engagement tabs 108.

Figure 5:
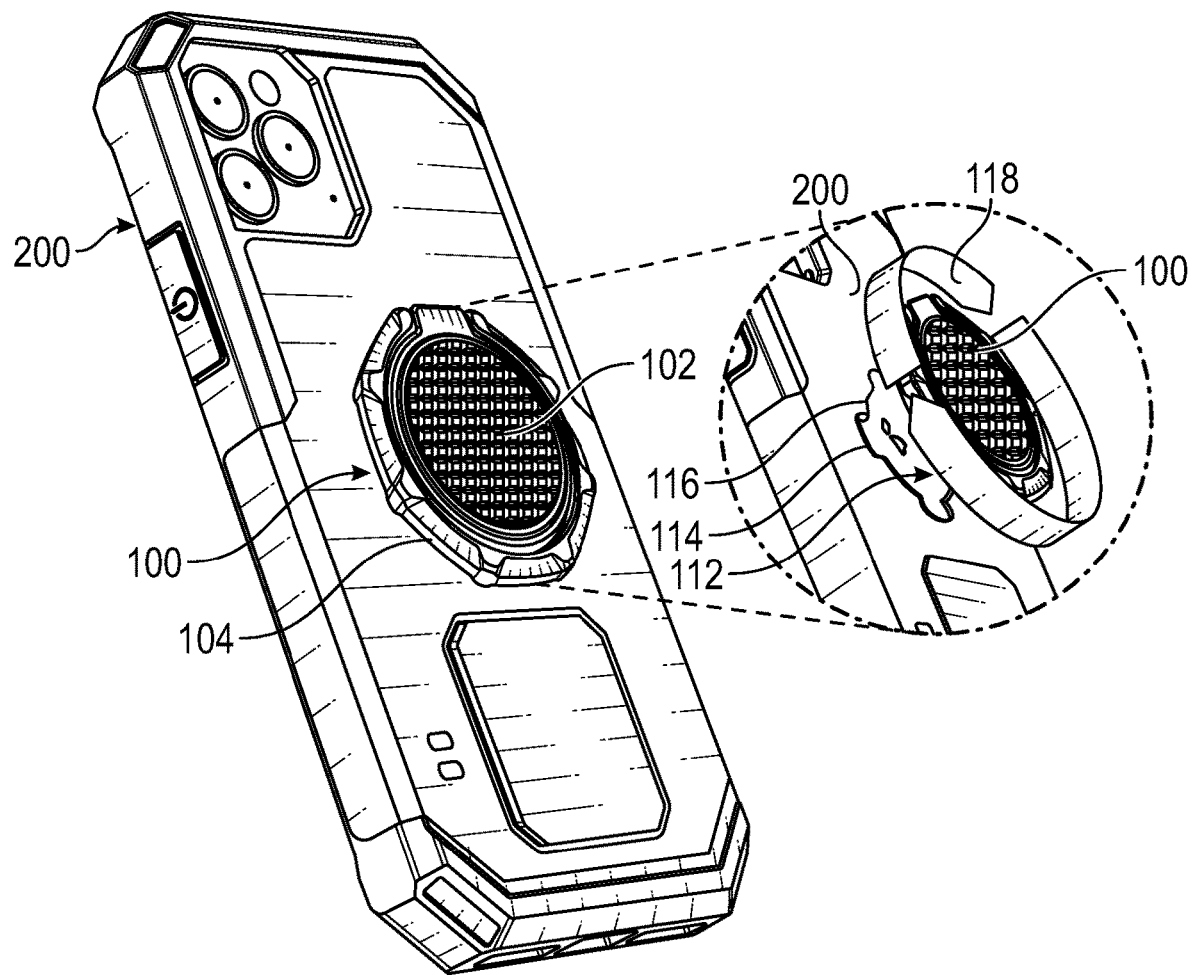
FIG. 5 illustrates example features of the example embodiment of the mount assembly and case of FIG. 1 that can facilitate coupling.

As illustrated in FIG. 5, the interlocking member 106 and feet 126 can facilitate coupling to the case 200. The case 200 can have an opening 112 (also referred to as a receiving region or space) with which the interlocking member 106 and feet 126 can interface. Stated differently, the opening 112 can receive the interlocking member 106 to couple the mount assembly 100 to the case 200. The opening 112 can include one or more access spaces 114 (also referred to as access openings or recesses). As illustrated, the opening 112 includes four access space 114. In some variants, the opening 112 can include one, two, three, five, six, or more access spaces 114. The number of access space 114 can correspond to the number of engagement tabs 108. The access spaces 114 can be radially distributed about a periphery of the opening 112. The access spaces 114 can correspond to the engagement tabs 108 and feet 126, which can include being sized and shaped to receive the engagement tabs 108 and feet 126. The case 200 and/or receiving region 112 can include one or more tabs 116 positioned between adjacent access spaces 114. As illustrated, four tabs 116 are included. In some variants, the two, three, five, six, or more tabs 116 can be included.

To lock the mount assembly 100 and/or mount 102 to the case 200, the user can align the one or more engagement tabs 108 with the one or more access spaces 114. The user can insert the one or more engagement tabs 108 through the one or more access spaces 114. The user can rotate the mount assembly 100 and/or mount 102, which includes the interlocking member 106, in a first direction such that the engagement tabs 108 are positioned behind the one or more tabs 116. The first direction can be in the direction of arrow 118 (e.g., a clockwise direction) to interlock the mount assembly 100 with the case 200. One or more engagement surfaces or slots (e.g., pocket(s)) of the case 200 can be positioned behind the one or more tabs 116 to interface with the engagement tabs 108 to prohibit or impede further rotation of the mount assembly 100 and/or mount 102 in the first direction at a desired rotational orientation. The one or more engagement surfaces can impede further rotation of the mount assembly 100 and/or mount 102 at a position such that the one or more feet 126 are aligned with the one or more access spaces 114. The user can move the mount 102 toward the case 200 to insert the one or more feet 126 into the one or more access spaces 114 such that the mount assembly 100 and/or mount 102 is secured to the case 200. In some variants, the one or more engagement surfaces or slots (e.g., pocket(s)) can guide the mount assembly 100 and/or mount 102 in the direction of the case 200 during rotation in the first direction such that the one or more feet 126 are moved into the one or more access spaces 114 to lock the mount assembly 100 and/or mount 102 to the case 200.

To unlock the mount assembly 100 and/or mount 102 from the case 200, the user can rotate the mount assembly 100 and/or mount 102 in a second direction opposite the first direction (e.g., a counter clockwise direction). The engagement surfaces can guide the mount assembly 100 and/or mount 102 in a direction away from the case 200 during rotation in the second direction, which can dislodge the one or more feet 126 from the one or more access spaces 114. In some variants, the user can maneuver the mount assembly 100 and/or mount 102 away from the case 200 to remove the one or more feet 126 from within the one or more access spaces 114. The user can continue to rotate the mount assembly 100 and/or mount 102 in the second direction until the one or more engagement tabs 108 are removed from under the one or more tabs 116 and aligned with the one or more access spaces 114, allowing the user to pull the engagement tabs 108 out of the access spaces 114 to unlock the mount assembly 100 and/or mount 102 from the case 200. In some variants, the one or more engagement tabs 108 can impede rotation of the mount assembly 100 and/or mount 102 in the second direction to an orientation that would position the one or more engagement tabs 108 past the one or more access spaces 114. Further details regarding some of the features of the interlock between the interlocking member 106 and the case 200 can be found in U.S. Pat. No. 8,708,151, entitled CASE AND MOUNT SYSTEM FOR HANDHELD ELECTRONIC DEVICE, filed on Aug. 23, 2012, which is hereby incorporated by reference in its entirety. In some variants, the mount assembly 100 and/or mount 102 is secured to the case 200 via a fastening technique, adhesion, threaded connection, snap fit, press fit, and/or via other techniques. In some variants, the mount 102 is a monolithic feature of the case 200.

Figure 6:
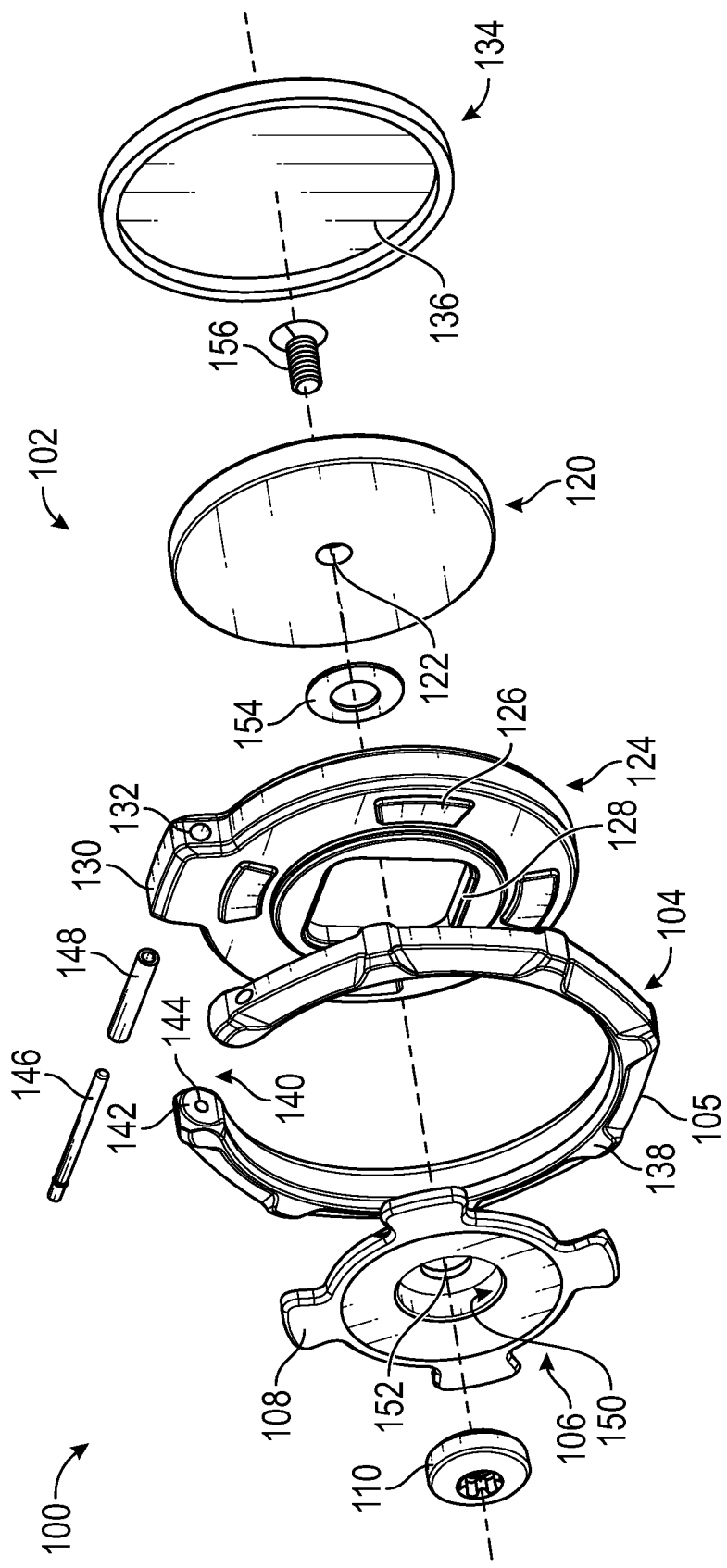
FIG. 6 illustrates an exploded view of the example embodiment of the mount assembly of FIG. 1.

FIG. 6 illustrates an exploded view of the mount assembly 100. As described above, the mount assembly 100 can include a mount 102. The mount 102 can include a mounting base 124, magnet 120, cover 134, and/or interlocking member 106, amongst other features. The mounting base 124 can include the one or more feet 126 described above. The mounting base 124 can receive a magnet 120 therein. The mounting base 124 can include a cavity to receive the magnet 120 or at least a portion of the magnet 120 therein. The mounting base 124 can be made of a variety of materials, which can include glass-filled nylon.

The magnet 120 can be circular, as illustrated. In some variants, the magnet 120 can be other shapes, which can include oval, polygonal, irregular, and/or others. The magnet 120 can included neodymium or other materials. The magnet 120 can be plated. The cover 134 can enclose and/or cover the magnet 120 within the mounting base 124. The cover 134 can include a cavity 136 to receive at least a portion of the magnet 120 therein. In some variants, a portion of the magnet 120 extends outside the mounting base 124, which the cover 134 covers. In some variants, the cover 134 is adhered to the magnet 120 and/or mounting base 124. In some variants, the cover 134 is coupled to the mounting base 124 and/or magnet 120 via a threaded connection. In some variants, friction retains the cover 134 positioned over the magnet 120. The cover 134 can include the anti-slip surface 103 described herein. The cover 134 can be made of a material with a large co-efficient of friction and/or ability to absorb shock, such as rubber.

Figure 7:
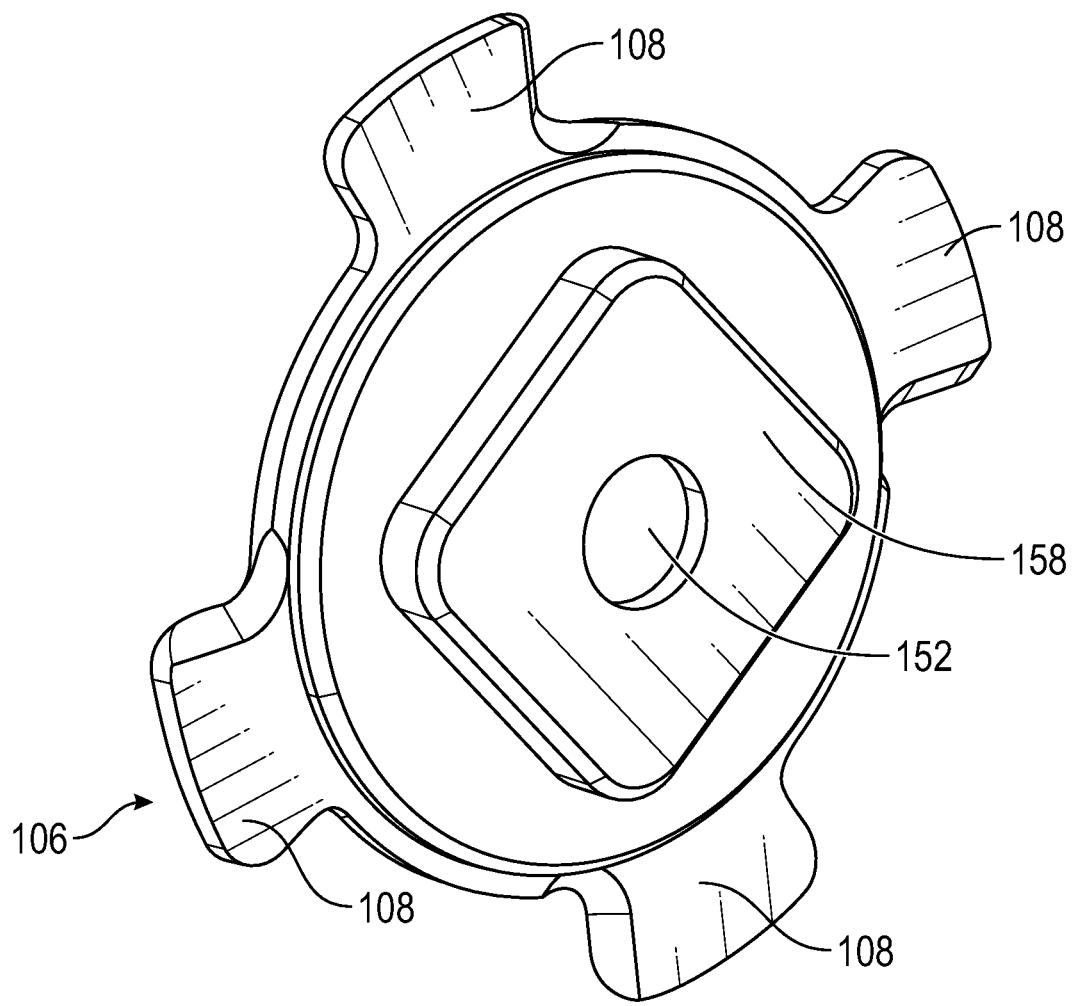
FIG. 7 illustrates an example embodiment of the interlocking member of the example embodiment of the mount assembly of FIG. 1.

The mounting base 124 can include an opening 128. The opening 128 can be sized and shaped to receive a protrusion 158 of the interlocking member 106, as shown in FIG. 7. The interface between the opening 128 and protrusion 158 can help to prevent relative rotation between the mounting base 124 and the interlocking member 106. In some variants, the protrusion 158 can have a square periphery. In some variants, the protrusion 158 can be other shapes, such as oval, polygonal (e.g., triangular, rectangular, etc.), and/or irregular. The protrusion 158 can include rounded corners to reduce stress concentrators. The opening 128 can be sized and shaped corresponding to the protrusion 158, which can include facilitating a press or friction fit between the periphery of the opening 128 and the protrusion 158 or offsetting the periphery of the opening 128 from the periphery of the protrusion 158. The opening 128 can include a periphery with rounded corners to reduce stress concentrators.

For assembly, the magnet 120 can be disposed within the mounting base 124. The protrusion 158 can be positioned within the opening 128 of the mounting base 124. A bolt 156 can be inserted through a hole 122 of the magnet 120 and hole 152 of the interlocking member 106. A washer 154 (also referred to as a conical spring washer, Belleville washer, disc spring) can be disposed within a cavity 150 (also referred to as a recess) of the interlocking member 106 and around the bolt 156. The washer 154 can be made of a variety of materials, which can include high carbon steel. A boss 110 (also referred to as a threaded boss or nut) can be screwed onto the bolt 156, coupling the magnet 120, mounting base 124, and interlocking member 106 together. Thread locker can be applied to the bolt 156 and boss 110 and/or any other fastener connection. The boss 110 can be made of a variety of materials, which can include titanium and/or being anodized. The bolt 156 can be made of a variety of materials, which can include stainless steel and/or a PVD coat. The cover 134 can be positioned over the magnet 120, which can include being coupled to the mounting base 124 and/or magnet 120.

The ring 104 can include a gap 140. The gap 140 can extend between two ends 142 of the ring 104. The two ends 142 can be positioned on opposing sides of the tab 130 of the mounting base 124 to facilitate coupling. Stated differently, the tab 130 can be disposed in the gap 140. A hole 144 of each of the two ends 142 can be aligned coaxially with a cavity 132 through the tab 130. A bushing 148 can be disposed in the cavity 132. A pin 146 can be inserted into the holes 144 and through the cavity 132 to rotatably couple the ring 104 to the mounting base 124. The bushing 148 can be made of a variety of materials, which can include thermoplastic polyurethane. The pin 146 can be made of a variety materials, which can include stainless steel.

The interface between the ring 104, tab 130, pin 146, and/or bushing 148 can be an inference fit. In some variants, the fit between the ring 104, tab 130, pin 146, and/or bushing 148 can prevent free rotation of the ring 104 via gravity such that the ring 104 will rotate when manipulated by the user but is unlikely to rotate unintentionally via movement of the case 200. In some variants, the ring 104 can be maintained in a deployed position or the stowed position via the fit between the ring 104, tab 130, pin 146, and/or bushing 148. In some variants, the ring 104 can be positioned in discrete rotational positions. In some variants, the ring 104 can be positioned along a continuum of rotational positions. The mount assembly 100 and/or mount 102 can be secured to the case 200 using any of the methods described herein. In some variants, the mount assembly 100 does not include an interlocking member 106, but instead, the mounting base 124 is coupled to the case 200 via one or more techniques described herein (e.g., via fasteners, adhesion, etc.)

Figure 9:
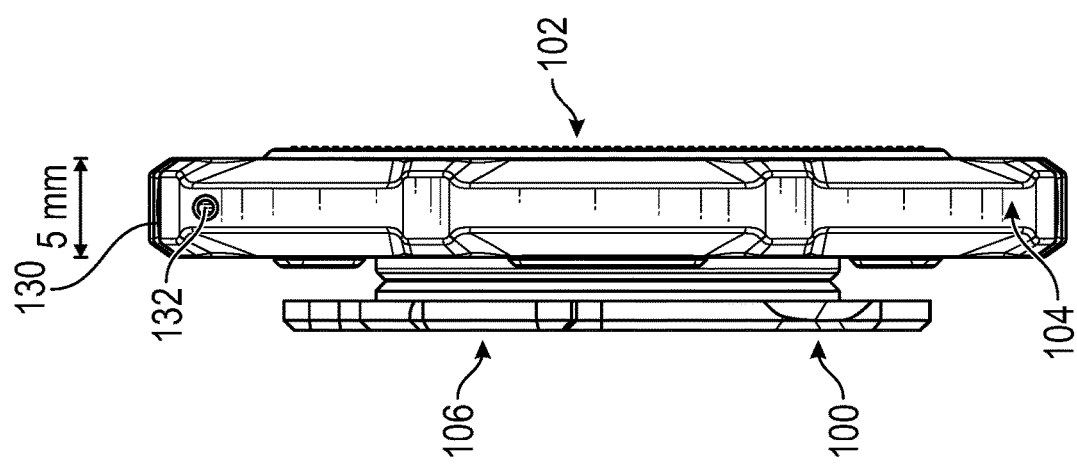
FIG. 9 illustrates a side view of the example embodiment of the mount assembly of FIG. 1.
Figure 8:
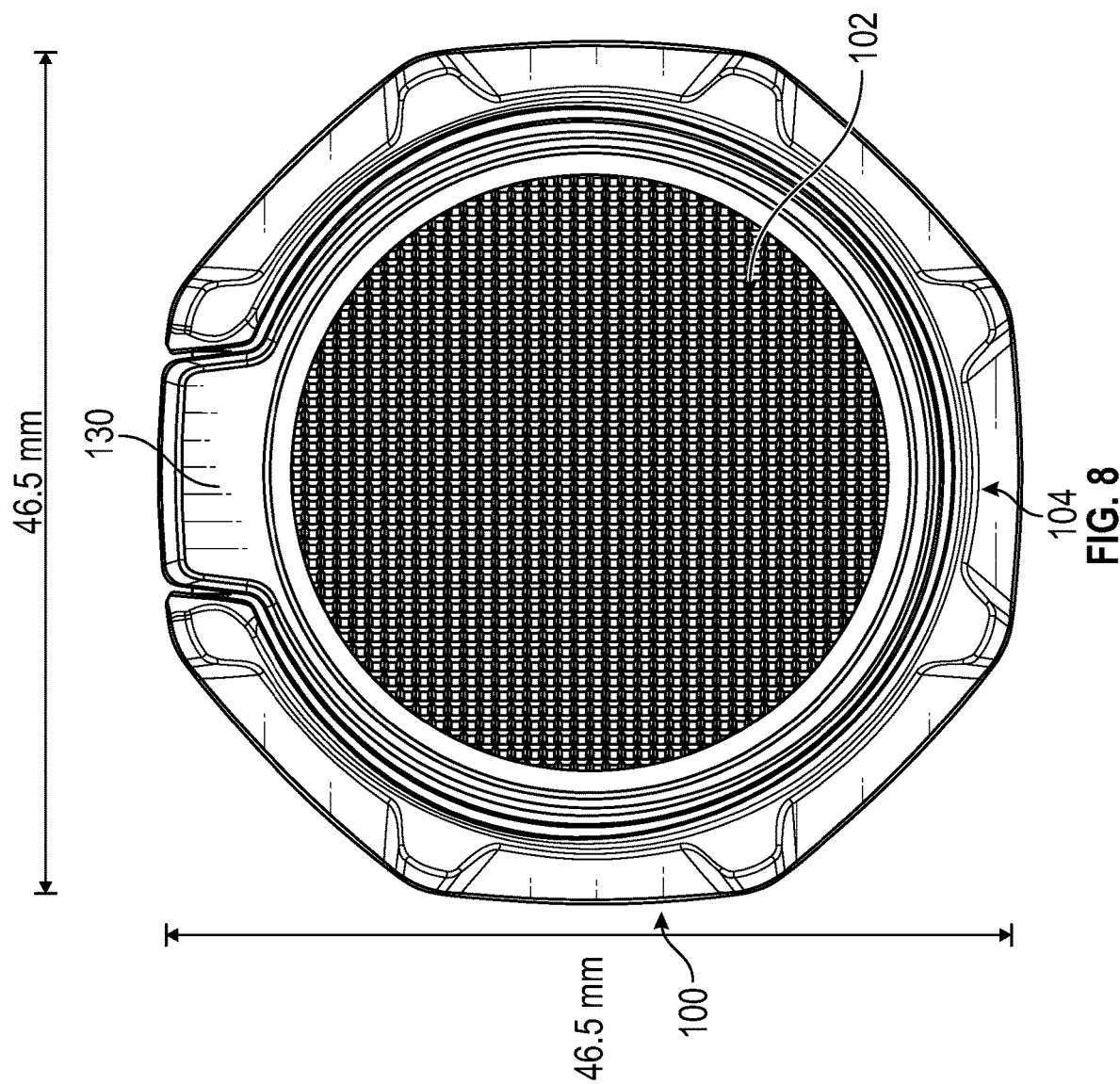
FIG. 8 illustrates a front view of the example embodiment of the mount assembly of FIG. 1

FIGS. 8 and 9 illustrate the assembled mount assembly 100 with ring 104 in the stowed configuration in varying views. FIGS. 8 and 9 include some example dimensions which are merely exemplary and should not be considered limiting.

Figure 10A:
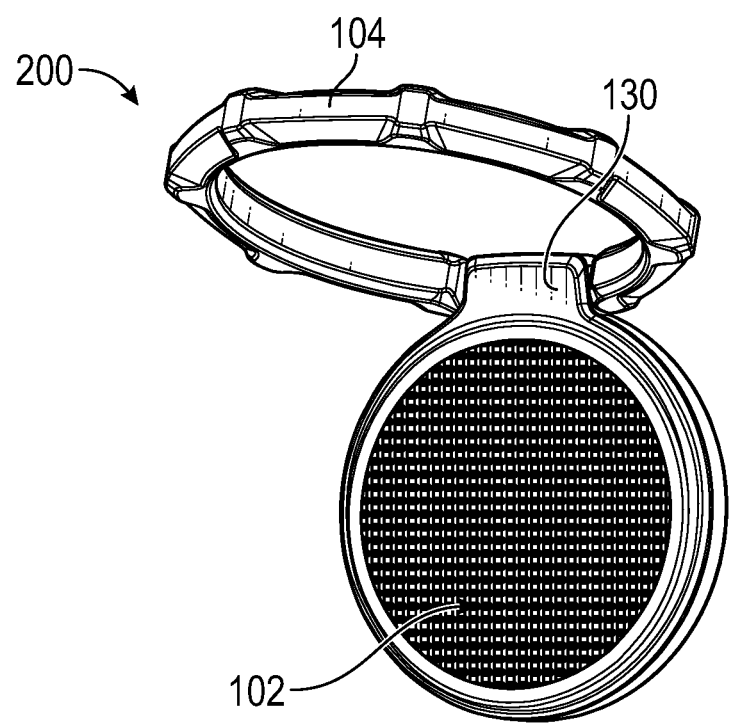
FIG. 10A illustrates an example embodiment of a mount assembly with a ring deployed.
Figure 10B:
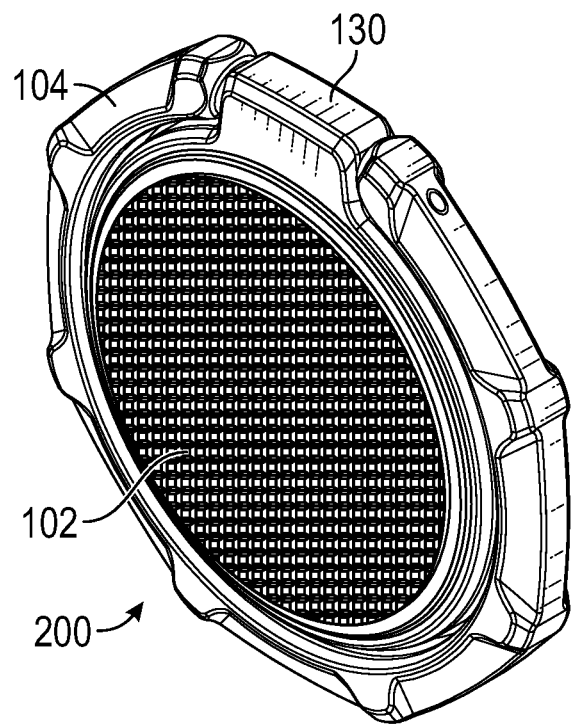
FIG. 10B illustrates the example embodiment of the mount assembly of FIG. 10A with the ring stowed.
Figure 10C:
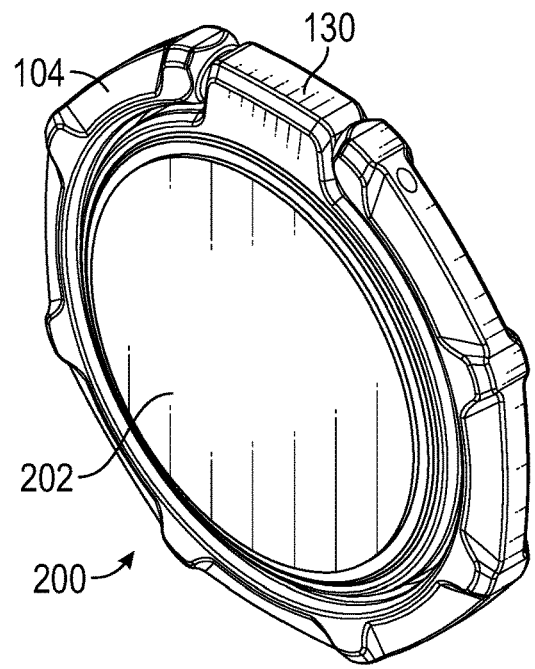
FIG. 10C illustrates another view of the example embodiment of the mount assembly of FIG. 10A with the ring stowed.
Figure 10D:
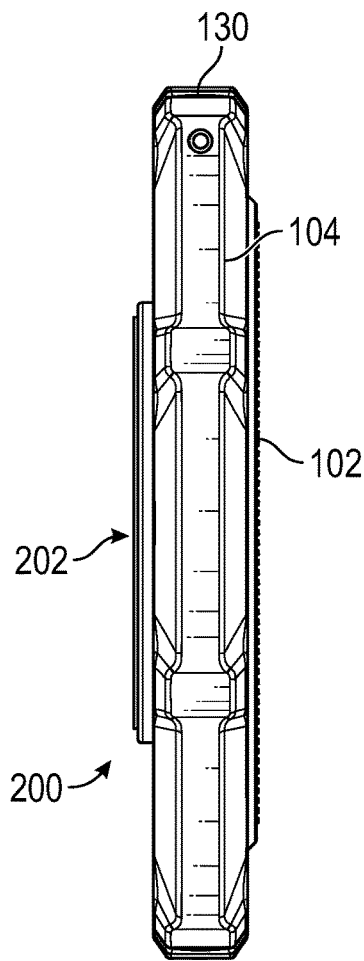
FIG. 10D illustrates another view of the example embodiment of the mount assembly of FIG. 10A with the ring stowed.
Figure 11:
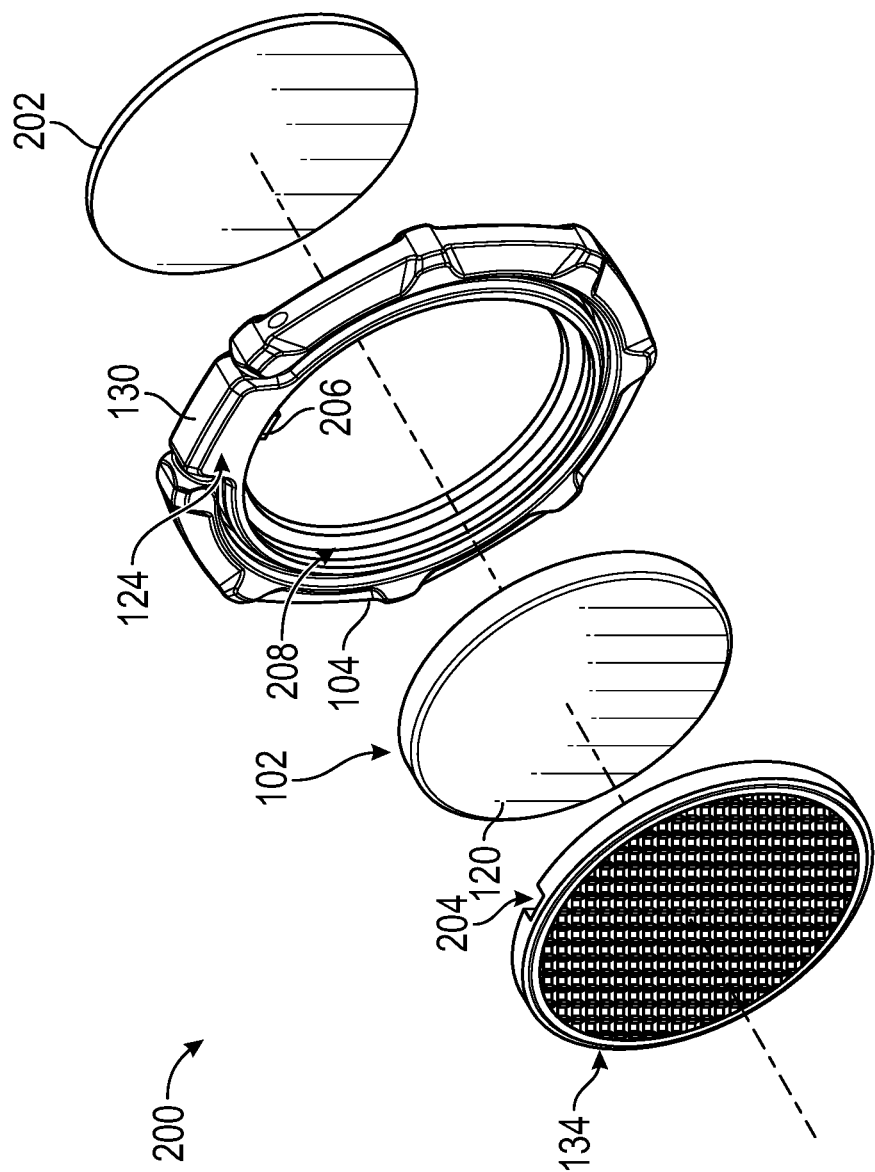
FIG. 11 illustrates an exploded view of the example embodiment of the mount assembly of FIG. 10A.

With reference to FIGS. 10A-11, an example embodiment of a mount assembly 200 (also referred to as a handheld electronic device mount) is illustrated. The mount assembly 200 can be can be mounted, connected, attached, interlocked, adhered, fastened, and/or otherwise coupled with a case (also referred to as a protective shell) for a handheld electronic device, directly to the handheld electronic device, or another surface. Specifically, the mount assembly 200 can include an adhesive backing 202, as shown in FIG. 10C, that can be used to adhere a mount 102 to the case for a handheld electronic device, directly to the handheld electronic device, or another surface to facilitate universal coupling. The adhesive backing 202 can include adhesive properties that facilitate adhesion. In some embodiments, adhesive or an adhesive element (e.g., sticker, tape, etc.) can be applied to the adhesive backing 202 to facilitate adhesion. The adhesive backing 202 can be disposed on a rear surface and/or portion of the mount 102. In some embodiments, the adhesive backing 202 is not used to couple the mount 102 to the case, but instead, the magnet of the mount assembly 200 magnetically couples the mount 102 to the case and/or handheld electronic device.

As described herein, the mount assembly 200 can include a ring 104 (also referred to as a ring stand). The ring 104 can be deployed, as illustrated in FIG. 10A, to prop up or support the case of a handheld electronic device and/or handheld electronic device and/or be grasped by a user. In the deployed configuration, the ring 104 can be rotated away from the mount 102. The ring 104 can be coupled to the mount 102 at a tab 130 thereof. The ring 104 can rotate about the tab 130 to move between the deployed configuration, illustrated in FIG. 10A, and a stowed configuration illustrated in FIGS. 10B-10D. In the stowed configuration, the ring 104 can be disposed around the mount 102, which can decrease the profile of the mount assembly 200.

FIG. 11 illustrates an exploded view of the mount assembly 200. The mount assembly 200, as described, can include the mount 102. The mount 102 can include a mounting base 124, magnet 120, and/or cover 134, amongst other features. The adhesive backing 202 can be disposed on a rear surface of the mount 102, as described herein.

The mounting base 124 can receive a magnet 120 therein. The mounting base 124 can include a recess 208, which can also be referred to as a cavity, pocket, receiving space, and/or receiving region, that can receive the magnet 120. The mounting base 124 can have a peripheral structure that is configured to be positioned within the inner periphery of the ring 104 when the ring 104 is in the stowed configuration. In some embodiments, the recess 208 can be formed in an interior of the peripheral structure. The mounting base 124 can have an opening or hole therethrough, which can allow the adhesive backing 202 to be coupled to the magnet 120, which can, in some embodiments, facilitate the adhesion of the magnet 120 to the adhesive backing 202. In some embodiments, the mounting base 124 can be ring shaped.

The cover 134 can be disposed over the magnet 120. The cover 134 can be placed over the magnet 120 disposed in the recess 208 to secure the magnet 120. The mounting base 124 can include a tab 206, which can also be referred to a flange or protrusion. The tab 206 can extend inward from the peripheral structure of the mounting base 124. The cover 134 can include a notch 204, which can also be referred to as a slot, gap, and/or cutout, that can correspond to the tab 206. The tab 206 and notch 204 can be used to orient the coupling of the mounting base 124 and the cover 134 to each other, which can help to orient graphics (e.g., lettering, logo, etc.) disposed on the cover 134. The notch 204 can be aligned with the tab 206 and the cover 134 advanced toward the mounting base 124 to position the cover 134 over the magnet 120 and the tab 206 in the notch 204.

Figure 12A:
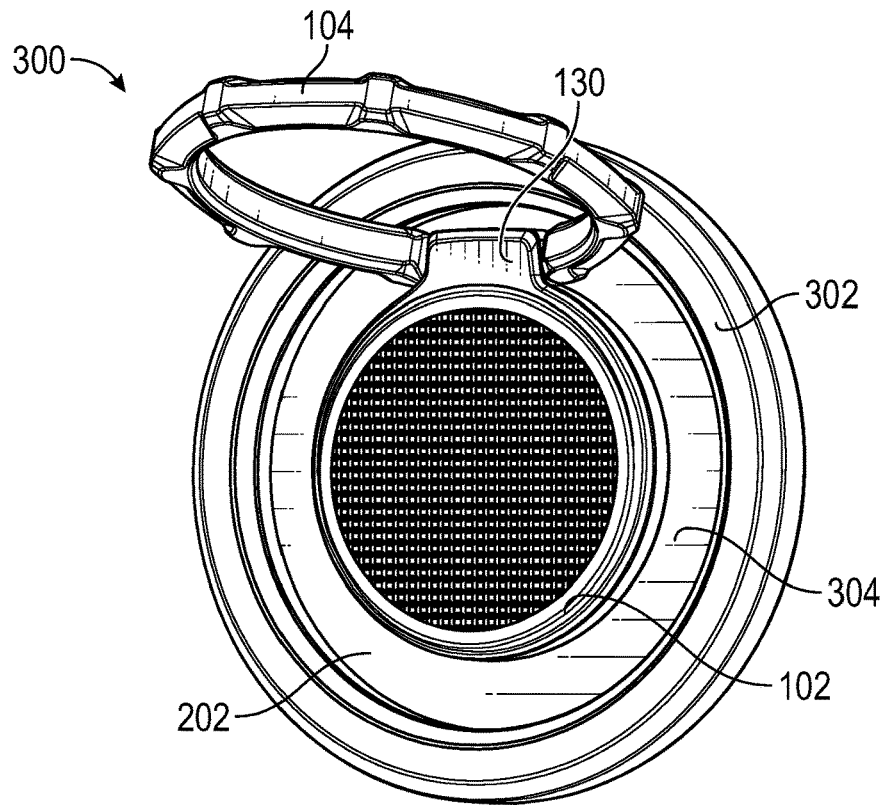
FIG. 12A illustrates an example embodiment of a mount assembly with a ring deployed.
Figure 12B:
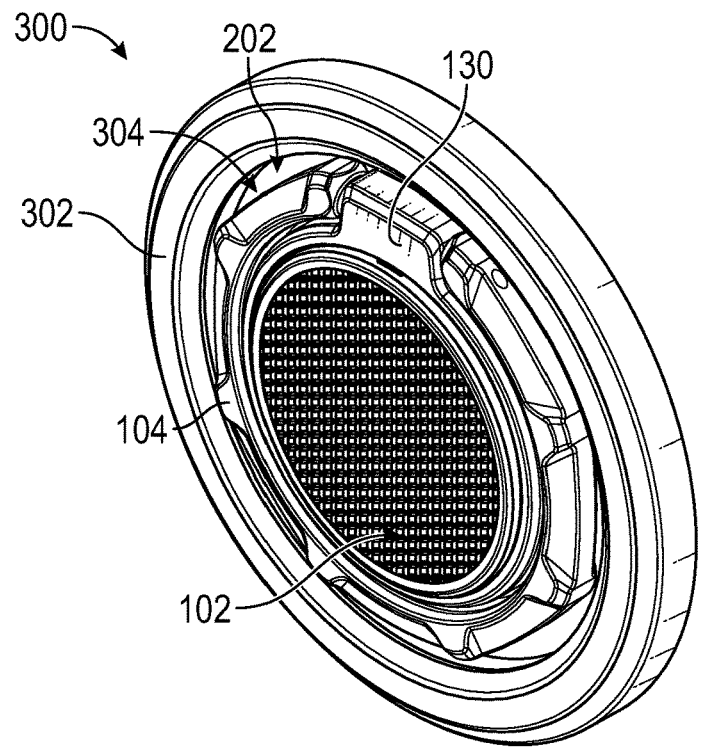
FIG. 12B illustrates the example embodiment of the mount assembly of FIG. 12A with the ring stowed.
Figure 12D:
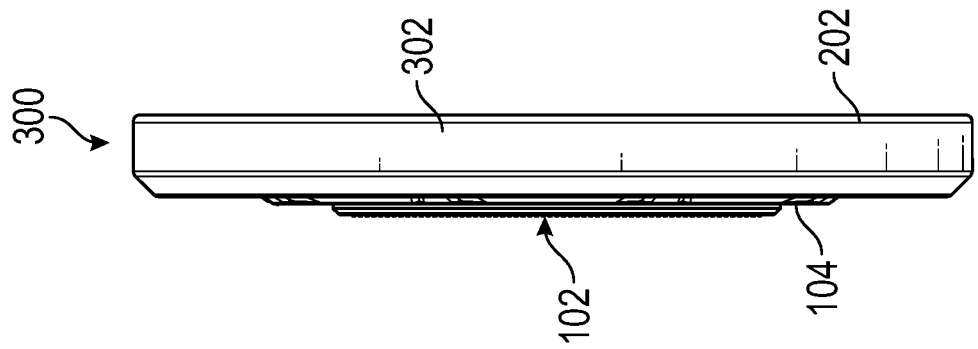
FIG. 12D illustrates another view of the example embodiment of the mount assembly of FIG. 12A with the ring stowed.
Figure 12C:
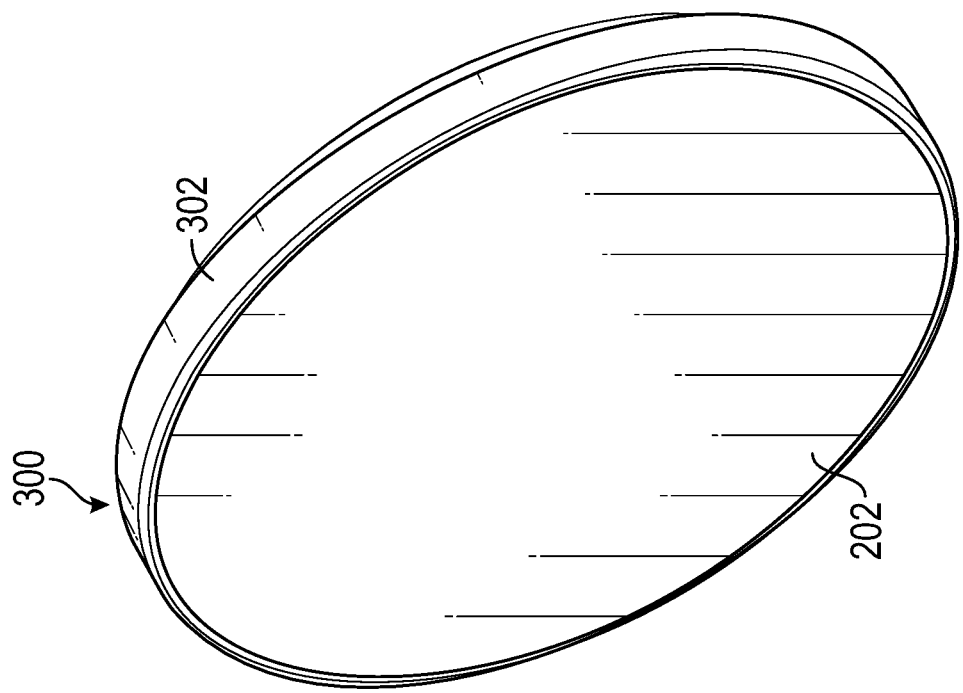
FIG. 12C illustrates another view of the example embodiment of the mount assembly of FIG. 12A with the ring stowed.
Figure 13:
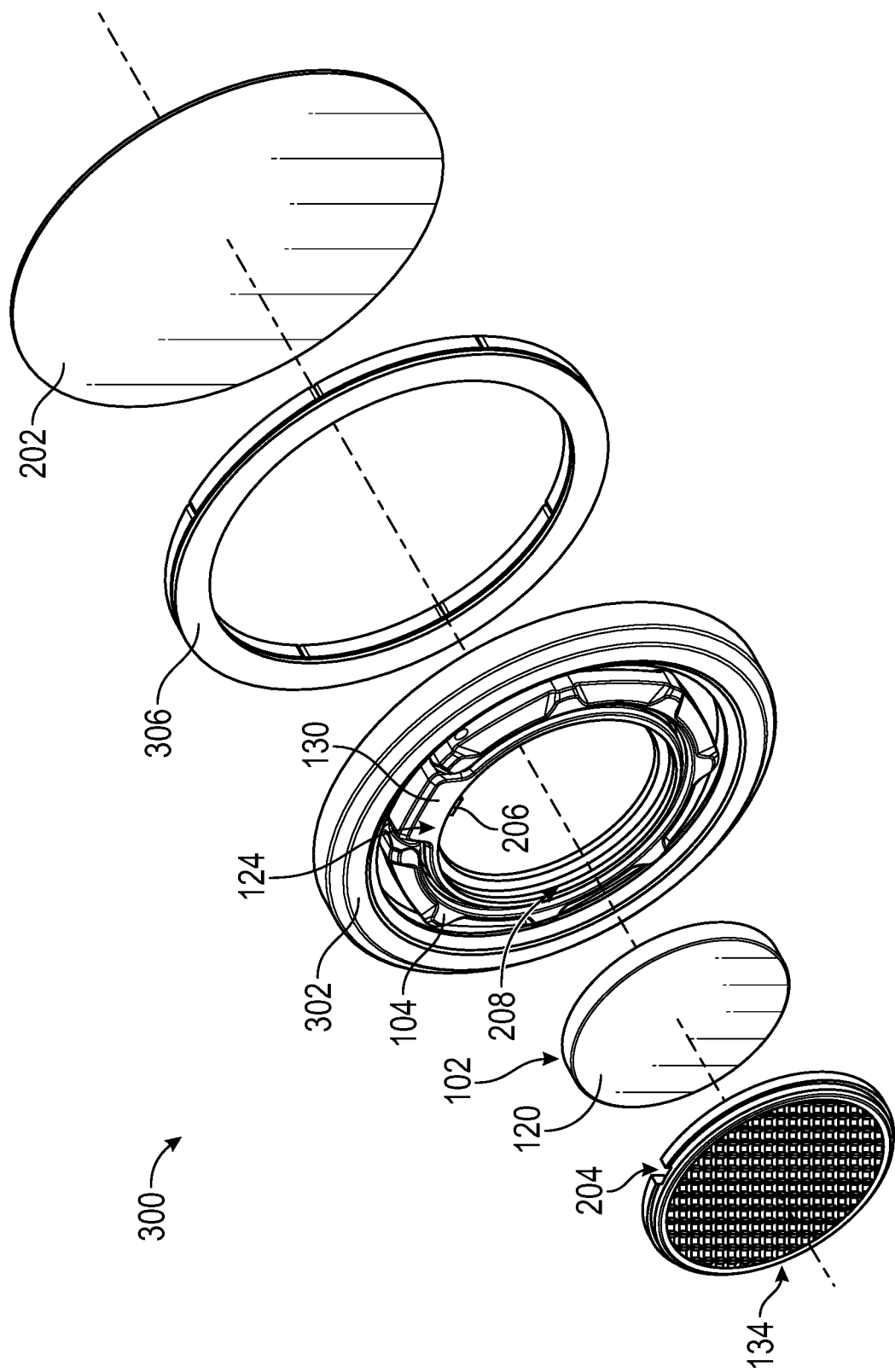
FIG. 13 illustrates an exploded view of the example embodiment of the mount assembly of FIG. 12A.

With reference to FIGS. 12A-13, an example embodiment of a mount assembly 300 (also referred to as a handheld electronic device mount) is illustrated. The mount assembly 300 can be mounted, connected, attached, interlocked, adhered, fastened, and/or otherwise coupled with a case (also referred to as a protective shell) for a handheld electronic device, directly to the handheld electronic device, or another surface. Specifically, the mount assembly 300 can include a magnet that can facilitate coupling to the case and/or directly to the handheld electronic device by way of magnetic attraction. In some embodiments, the mount assembly 300 can include an adhesive backing 202, as shown in FIG. 10C, that can be adhered to the case for a handheld electronic device, directly to the handheld electronic device, or another surface to facilitate universal coupling. The adhesive backing 202 can include adhesive properties that facilitate adhesion to components of the mount assembly 300 and/or a case, handheld electronic device, and/or another surface. In some embodiments, adhesive or an adhesive element (e.g., sticker, tape, etc.) can be applied to the adhesive backing 202 to facilitate adhesion.

The mount 102, outer ring cover 302, and/or outer ring disposed within the outer ring cover 302 can be positioned on a front face of the adhesive backing 202. The outer ring cover 302 can be disposed around the mount 102 and ring 104. A channel 304 can be disposed between the mount 102 and the outer ring cover 302. The channel 304 can receive the ring 104 therein. The channel 304 can be ring shaped. The channel 304 can be of sufficient depth such that the ring 104 can be entirely disposed therein. In the deployed configuration, the ring 104 can be rotated about the tab 130 to be positioned outside of the channel 304, as shown in FIG. 12A. In the stowed configuration, the ring 104 can be rotated about the tab 130 to within the channel 304, as shown in FIGS. 12B-12D. The outer ring cover 302 and/or outer ring therein can be referred to as a ring assembly. The outer ring disposed within the outer ring cover 302 can be MagSafe and/or configured to be compatible with MagSafe. The outer ring can help facilitate wireless charging between a power source and a handheld electronic device upon which the mount assembly 300 is mounted. The outer ring cover 302 and/or outer ring therein can protect the mount 102 and ring 104 from impact and/or catching on objects. As shown in FIG. 12C, the periphery of the adhesive backing 202 can be the same as an outer periphery of the outer ring cover 302, which can be circular.

FIG. 13 illustrates an exploded view of the mount assembly 300. The mount assembly 300 can include the mount 102. The mount 102 can include a mounting base 124, magnet 120, and/or cover 134, amongst other features, as described herein. The outer ring cover 302, which can be disposed around the mount 102 and ring 104, can be disposed over an outer ring 306, which can also be referred to as MagSafe ring, outer ring compatible with MagSafe, and/or MagSafe ring assembly. The outer ring 306 can be disposed on a front face of the adhesive backing 202, which can include being adhered to the front face of the adhesive backing 202. The outer ring cover 302 can be disposed over the outer ring 306 to enclose the outer ring 306 between the outer ring cover 302 and the adhesive backing 202. The outer ring 306 can be disposed around the mount 102 and/or ring 104, which can, as described herein, protect the mount 102 and ring 104 from impact and/or catching on objects. In some embodiments, the outer ring 306 can have magnetic properties. In some embodiments, the outer ring 306 can, as described herein, be MagSafe and/or configured to be compatible with MagSafe. The outer ring 306 can help facilitate wireless charging between a power source and a handheld electronic device upon which the mount assembly 300 is mounted. In some embodiments, the magnet 120 can be MagSafe and/or configured to be compatible with MagSafe. In some embodiments, the magnet 120 can help facilitate wireless charging between a power source and a handheld electronic device upon which the mount assembly 300 is mounted.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A mount assembly for a handheld electronic device, the mount assembly comprising:
   a mount configured to be coupled to a case for the handheld electronic device, the mount comprising a magnet configured to secure the mount assembly to magnetic surfaces; and
   a ring rotatably coupled to the mount, the ring comprising:
      a front surface;
      a rear surface;
      an inner periphery configured to be disposed around an outer periphery of the mount;
      an outer periphery comprising a plurality of edges extending between the front surface and the rear surface and defining a first thickness, wherein the plurality of edges are each substantially the same length; and
      a plurality of protrusions, each of the plurality of protrusions spaced between adjacent pairs of the plurality of edges, wherein each of the plurality of protrusions define a second thickness that is greater than the first thickness,
      wherein the ring is configured to rotate between a stowed position and a deployed position.

2. The mount assembly of claim 1, wherein the ring is disposed around the mount in the stowed position.

3. The mount assembly of claim 1, wherein each of the plurality of edges is curved or straight, wherein one of the plurality of edges is configured to rest on a surface when the ring is in a deployed position.

4. The mount assembly of claim 1, wherein the mount comprises a mounting base and an interlocking member that is configured to interface with a receiving region of the case, wherein the magnet is configured to be positioned within the mounting base and coupled to the interlocking member.

5. The mount assembly of claim 4, wherein the interlocking member comprises a protrusion that is configured to be received within a corresponding opening of the mounting base such that the interlocking member and mounting base rotate together.

6. The mount assembly of claim 5, wherein the protrusion comprises a square periphery with rounded corners.

7. The mount assembly of claim 4, wherein the magnet is coupled to the mounting base and interlocking member via a bolt and a threaded boss.

8. The mount assembly of claim 7, wherein a conical spring washer is disposed between the threaded boss and the interlocking member.

9. The mount assembly of claim 4, wherein the interlocking member comprises a plurality of engagement tabs that are configured to facilitate coupling the mount assembly to a receiving region of the case via a twist-lock engagement.

10. The mount assembly of claim 4, wherein the mounting base comprises feet that are configured to facilitate coupling the mount assembly to the receiving region of the case via a twist-lock engagement.

11. The mount assembly of claim 1, further comprising adhesive backing disposed on a rear surface of the mount, the adhesive backing configured to facilitate adhering the mount assembly to the case.

12. The mount assembly of claim 1, further comprising an outer ring disposed around the mount, the outer ring configured to facilitate wireless charging of the handheld electronic device.

13. The mount assembly of claim 12, further comprising adhesive backing to facilitate adhering the mount assembly to the case, wherein the outer ring is disposed on a front face of the adhesive backing.

14. The mount assembly of claim 12, further comprising a channel configured to receive the ring in the stowed position, the channel disposed between the outer ring and the mount.

15. The mount assembly of claim 1, wherein the rear surface of the ring is adjacent to the case when in the stowed position.

16. A mount assembly for a handheld electronic device, the mount assembly comprising:
   a mount configured to be coupled to a case for a handheld electronic device, the mount comprising a magnet configured to secure the mount assembly to magnetic surfaces;
   a ring rotatably coupled to the mount, the ring comprising;
   a front surface;
   a rear surface;
   an inner periphery configured to be disposed around an outer periphery of the mount;
   an outer periphery comprising a plurality of edges extending between the front surface and the rear surface and defining a first thickness, wherein the plurality of edges are each substantially the same length;
   a plurality of protrusions, each of the plurality of protrusions spaced between adjacent pairs of the plurality of edges, wherein each of the plurality of protrusions define a second thickness that is greater than the first thickness,
   wherein the ring is configured to rotate between a stowed position around the mount and a deployed position rotated away from the mount; and
   an outer ring configured to be disposed around the ring in the stowed position, the outer ring configured to facilitate wireless charging of the handheld electronic device.

17. The mount assembly of claim 16, further comprising adhesive backing on the mount and outer ring, and the adhesive backing is configured to facilitate adhesion to the case.

18. The mount assembly of claim 16, further comprising a channel configured to receive the ring in the stowed position, the channel disposed between the outer ring and the mount.

19. The mount assembly of claim 16, wherein the mount comprises a mounting base and a cover, the mounting base housing the magnet therein and the cover disposed over the magnet.

20. The mount assembly of claim 19, wherein the mounting base comprises a tab and the cover comprises a corresponding notch, the tab configured to be disposed in the notch to orient the mounting base and the cover relative to each other.

21. A mount assembly for a handheld electronic device, the mount assembly comprising:
   a mount configured to be coupled to a case for the handheld electronic device; and a ring rotatably coupled to the mount, the ring comprising:
a front surface;
a rear surface;
an inner periphery configured to be disposed around an outer periphery of the mount;
an outer periphery comprising a plurality of edges extending between the front surface and the rear surface and defining a first thickness, wherein the plurality of edges are each substantially the same length; and
a plurality of protrusions, each of the plurality of protrusions spaced between adjacent pairs of the plurality of edges, wherein each of the plurality of protrusions define a second thickness that is greater than the first thickness,
wherein the ring is configured to rotate between a stowed position and a deployed position.

* * * * *